(12) United States Patent
Gochin et al.

(10) Patent No.: US 6,270,653 B1
(45) Date of Patent: Aug. 7, 2001

(54) METHOD OF CONTROLLING ASPHALTENE PRECIPITATION IN A FLUID

(75) Inventors: Rodney J. Gochin, Tadworth; Alec Smith, Chester, both of (GB)

(73) Assignee: Imperial College of Science, Technology & Medicine, London (GB)

( * ) Notice: Subject to any disclaimer, the term of this patent is extended or adjusted under 35 U.S.C. 154(b) by 0 days.

(21) Appl. No.: 09/341,440

(22) PCT Filed: Jan. 9, 1998

(86) PCT No.: PCT/GB98/00051

§ 371 Date: Sep. 29, 1999

§ 102(e) Date: Sep. 29, 1999

(87) PCT Pub. No.: WO98/30784

PCT Pub. Date: Jul. 16, 1998

(30) Foreign Application Priority Data

Jan. 9, 1997 (GB) .................................. 9700320

(51) Int. Cl.[7] .................................................. C10C 3/02
(52) U.S. Cl. .............................. 208/44; 208/309; 208/39; 208/45; 208/44
(58) Field of Search .................................. 208/44, 309, 45

(56) References Cited

U.S. PATENT DOCUMENTS

| | | | |
|---|---|---|---|
| 3,172,473 | 3/1965 | Crowley et al. | 166/41 |
| 3,276,519 | * 10/1966 | Knox et al. | 166/41 |
| 4,428,818 | * 1/1984 | Derbyshire et al. | 208/10 |
| 4,441,890 | * 4/1984 | Feldman | 44/51 |
| 5,021,498 | * 6/1991 | Stephenson et al. | 424/184 |
| 5,214,224 | * 5/1993 | Stephenson et al. | 424/184 |

FOREIGN PATENT DOCUMENTS

| 258179 | 7/1987 | (EP) . |
|---|---|---|
| 9520637 | 8/1995 | (WO) . |

OTHER PUBLICATIONS

XP 010978325; WPI Derwent; AN 96–475274—Derwent week 199647; "Composition for preventing and removing asphaltene–resin–paraffin deposits—contains aromatic solvent and monalkyl ether of . . . ".

XP 009965424; WPI Derwent; AN 94–233137—Derwent week 199428; "Composition preventing asphaltene–resin––paraffin deposits—in oil industry equipment, contains specified surfactant, aromatic solvent and . . . ".

* cited by examiner

*Primary Examiner*—Helane E. Myers
(74) *Attorney, Agent, or Firm*—Renner, Otto, Boisselle & Sklar, LLP

(57) ABSTRACT

A method of controlling asphaltene precipitation in a fluid comprising the addition of a precipitation inhibitor to the fluid containing the asphaltene.

17 Claims, 3 Drawing Sheets

METHOD OF CONTROLLING ASPHALTENE PRECIPITATION IN A FLUID

The present invention relates to a method of controlling asphaltene precipitation and the use of certain compounds in such a method.

Asphaltene fractions are defined operationally as that portion of a crude oil or bitumen which precipitates on addition of a low molecular weight paraffin (usually n-pentane or n-heptane) but which is soluble in toluene. Asphaltenes are brown to black amorphous solids with complex structures, involving carbon, hydrogen, nitrogen, oxygen and sulphur and are basically formed of condensed aromatic nuclei associated with alicyclic groups. The particles are often surrounded by resins which are considered to add to dispersion stability. The molecular weight of asphaltene ranges from one thousand to several hundred thousand with a particle density of approximately 1200 kg/m$^3$ and a spheroidal shape about 10 nm in diameter. Colloidal asphaltene precipitation from petroleum reservoir fluids is recognised to present serious problems in numerous crude oil systems world-wide. Asphaltene precipitation may occur in the reservoir formation and cause permeability reduction or contribute to serious plugging problems in oil well tubing and surface facilities. Whilst not prevalent in the North Sea deposits, this phenomenon has lead to significant excess costs in the production operations of the oil industry in North America and the Middle East. The main approach to dealing with asphaltene problems is associated with well maintenance by either improved technology in clean-up methods for unplugging lines or asphaltene dissolution with various solutions.

We now propose a different approach to the problem of asphaltene deposits, which involves the prevention of the precipitation of the asphaltenes in the first place, rather than the approach taken in the prior art which involves dispersion of the precipitation.

Thus according to the present invention there is provided a method of controlling asphaltene precipitation in a fluid comprising the addition of a precipitation inhibitor.

In practice, the fluid will commonly be crude oil, and the precipitation inhibitor can be added using techniques known to those skilled in the art.

The stability of a dispersion in colloid science terms refers to the resistance of the particles to aggregation. The degree of this resistance is a measure of stability. Asphaltene colloidal dispersions in petroleum reservoirs are usually stable if free from any changes in physical properties. The behaviour of asphaltene in oil depends on the attractive and repulsive forces between adjacent particles. The interactions involved include van der Waals forces, steric effects and possibly electric double layer forces arising from charge at the interfaces. It is generally accepted that asphaltene coagulation and deposition occurs as a result of changes in parameters such as reservoir pressure, reservoir fluid temperature and oil composition brought about by normal recovery operations.

Surfactants can have either a stabilising or flocculating effect on dispersions into which they are introduced. The flocculating effect occurs especially when the reagent adsorbs on the particle surfaces and reduces charge, induces "bridging" effects between particles or causes hydrophobic interaction effects. Surfactants can also induce dispersion or maintain suspension stability. Then the mechanism is either by increasing surface charge or by contributing to steric (entropic) effects.

For effective stabilisation of dispersion to occur:
The surfactant has to adsorb on the particles
The dispersion medium has to be a "good solvent" for all or part of the surfactant molecule so that any carbon chains are extended and freely moving.

These two conditions are to an extent contradictory, but we have now found that a useful surfactant for dispersion/stabilisation often has an adsorbing part and, separately, a dissolving part of the molecule e.g. a block co-polymer of the AB or ABA type. The freely dissolved chains then give a repulsion when similar particles approach. The overlap region has a higher concentration of these chains and so an osmotic repulsion is produced.

Thus according to one embodiment of the present invention the precipitation inhibitor used in the present invention is a compound which has an adsorbing part and a dissolving part. Preferably the dissolving part of the molecule is a hydrocarbon-based chain or polymer, i.e. substantially composed of carbon and hydrogen.

More particularly, we have found a range of compounds which are especially suitable for use in the present invention. These compounds may be represented by the general formula I:

$$X\text{---}(R)_n \qquad \qquad I$$

where X is the adsorbing part of the compound and is preferably a carbocyclic ring containing 6 to 16 carbon atoms and which may be a mono- or bi-cyclic ring, such as benzene ($C_6$), naphalene ($C_{10}$) and anthracene ($C_{14}$). Naphalene is especially preferred; it is more soluble than anthracene and is less volatile than benzene.

R is the dissolving part of the molecule and is preferably an alkyl group containing 10 to 25 carbon atoms. Preferably R contains 12 to 20 carbon atoms, more preferably 14 to 18 carbon atoms, with 16 carbon atoms being especially preferred. In a most preferred embodiment R is hexadecyl ($C_{16}H_{33}$). It will be appreciated that R may be straight chain or branched chain. Preferably R is branched chain.

n is at least 1 and may equal the number of positions available for substitution in X. Preferably n is 1, 2 or 3. More preferably n is 1. When n is 2 or more, the R groups may be the same or different. Preferably there are two hexadecyl groups.

The carbocyclic ring may be optionally substituted in positions not occupied by R. Such substitutions should either not interfere with, or enhance, the properties of the compound. Suitable substituents may include $C_{1-6}$ alkyl groups such as methyl, ethyl, propyl, iso-propyl, n-butyl, iso-butyl, sec-butyl or t-butyl; or $C_{1-6}$ haloalkene such as fluoromethyl, difluoromethyl, trifluoromethyl, chloromethyl, dichloromethyl, trichloromethyl, 2-fluoroethyl, 2,2,2-trifluoroethyl and pentafluoroethyl.

Preferably the total number of substituents on X is no more than about 5 or 6. Once the number of substituents is greater than about 5 or 6, the adsorption of the X group on the asphaltene particle's surface may become impaired.

Similarly, the R group may be optionally substituted. Such substituents should either not interfere with, or enhance, the properties of the compound. Suitable substituents may include halogen, nitro, cyano, COOR' (where R' is H or $C_{1-6}$ alkyl) or a salt thereof, hydroxy and $C_{1-6}$ alkoxy.

According to an especially preferred embodiment of the present invention the molecule used to stabilize the asphaltene dispersion in crude oil is 2-hexadecyl naphthalene and as shown below as formula II

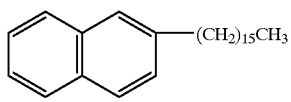

II

The hexadecyl chain will be in a good solvent in the aliphatic oil and so will be in an extended state and most effective at promoting steric repulsion. The naphthalene group was chosen because it is flat and hence, other things equal, it will have the maximum adsorption on a flat surface. The p electrons of the naphthalene molecule will render it more polarisable (with a high Hamaker coefficient) and hence more strongly adsorbed.

Various further preferred features and embodiment of the present invention will now be described by way of non-limiting example with reference to the accompanying Examples and Figures, in which.

The compounds for use in the present invention may be prepared by techniques known to those skilled in the art. An example of such a preparative method is given below in Example 1.

EXAMPLE 1

Preparation of 2-hexadecyl naphthalene 2-hexadecyl naphthalene was prepared by the Wolff-Kishner reduction of 2-hexadecanoyl naphthalene using the Huaing-Minlon modification (Anderson JACS)(1953) p449). 2-Hexadecanoyl naphthalene was prepared by the Friedel-Craft's reaction between 2-hexadecanoyl chloride (palmitoyl chloride) and naphthalene in the presence of anhydrous aluminium chloride and nitrobenzene using the method of Buu-Hoi & Cagnint (Bull. Soc. Chim., 12 (1945) p307). The presence of nitrobenzene seems to ensure the formation of the 2-isomer rather than a mixture of the 1- and 2-isomers. The compound obtained was then vacuum distilled and further purified by column chromatography on an alumina column in petroleum ether. Its purity was confirmed by melting point and infra-red spectroscopy.

Figure 1:
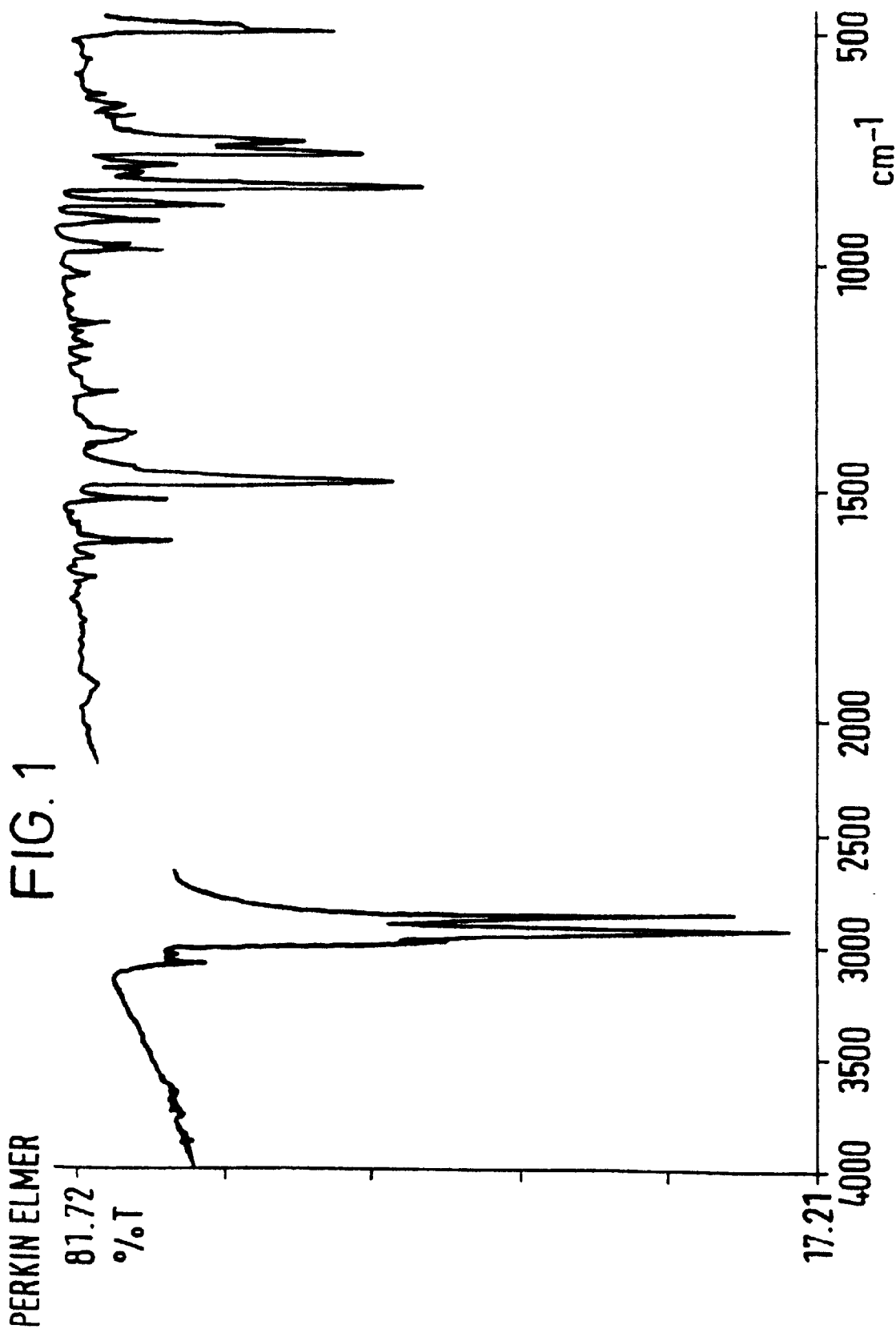
FIG. 1 shows the infra-red spectroscopy pattern of 2-hexadecyl naphthalene.

An alternative synthesis, which may be more appropriate for commercial exploitation, would be to react naphthalene directly with hexadecanol in the presence of an appropriate catalyst. This would give a mixture of isomers. The infra red spectroscopy pattern of 2-hexadecyl naphthalene is shown in FIG. 1.

EXAMPLE 2

Determination of Mode of Action of 2-hexadecyl naphthalene in Asphaltenic Crude Oils It is generally accepted that asphaltenes exist in petroleum oil as particles in a dispersed state, colloidally stabilised at least to some extent by the resins which act as peptizing agents. Resin molecules surround asphaltene particles and can form a layer giving a steric shield. If this protective shield is removed by for instance the dissolution of the resins into the fluid phase, the asphaltene particles start to aggregate into larger particles (i.e. coagulate) which can result in asphaltene deposition onto surfaces. The presence of 2-hexadecyl naphthalene will reduce the instability of asphaltene by mimicking the action of resins for maximum effectiveness in aliphatic solvents such as crude oil. The stabilisation of asphaltene particles by 2-hexadecyl naphthalene occurs when 2-hexadecyl naphthalene molecules are attached to the surfaces of asphaltene particles by the naphthalene heads and stretch the aliphatic chains out into the oil to form a steric stabilisation layer. Though this will only happen to maximum effect in an aliphatic liquid which is good solvent for the hexadecyl chain such as oil, it should however be partially effective in solvents such as toluene.

The particle size distribution of a solid in crude oil can not be easily determined by conventional techniques. A laser back-scattering technique was developed to avoid the difficulty in strongly absorbing dispersion media such as crude oil. The technique uses photon correlation spectroscopy, also called quasi elastic light scattering, but in the back-scatter mode rather than the more conventional forward scattering. This is particularly useful for concentrated dispersions or for strongly absorbing solutions as in this work. The instrument used in this work was supplied by Brookhaven Instruments, New York. The particle detection range was from 2 nm up to 10 $\mu$m. The instrument was supplied with a fibre optic probe to allow measurements in remote locations. Despite the relative sophistication of such an instrument, the measurement of particle size distribution remains difficult if the fluid has strongly absorbing characteristics like crude oil. This is because a considerable amount of laser light is absorbed and the intensity of back-scattered light can be very weak. In our version of the Brookhaven instrument, in order to go through a thick window in high pressure cells the optical probe was modified to give a focus point distance from the probe tip to the center of the scattering volume of about 4 mm. Two different cells were designed to carry out measurements of asphaltene particle sizes in oil. The first cell was designed in rectangular shape from black (carbon filled) PTFE with a 3.8 mm thick push fit quartz window. The other cell consists of a cylindrical housing made from thick plastic material with a window (quartz) held in one end of the cylindrical housing. With this technique the size distributions of asphaltene particles were monitored in the presence of the inhibitor 2-hexadecyl naphthalene.

Figure 2:
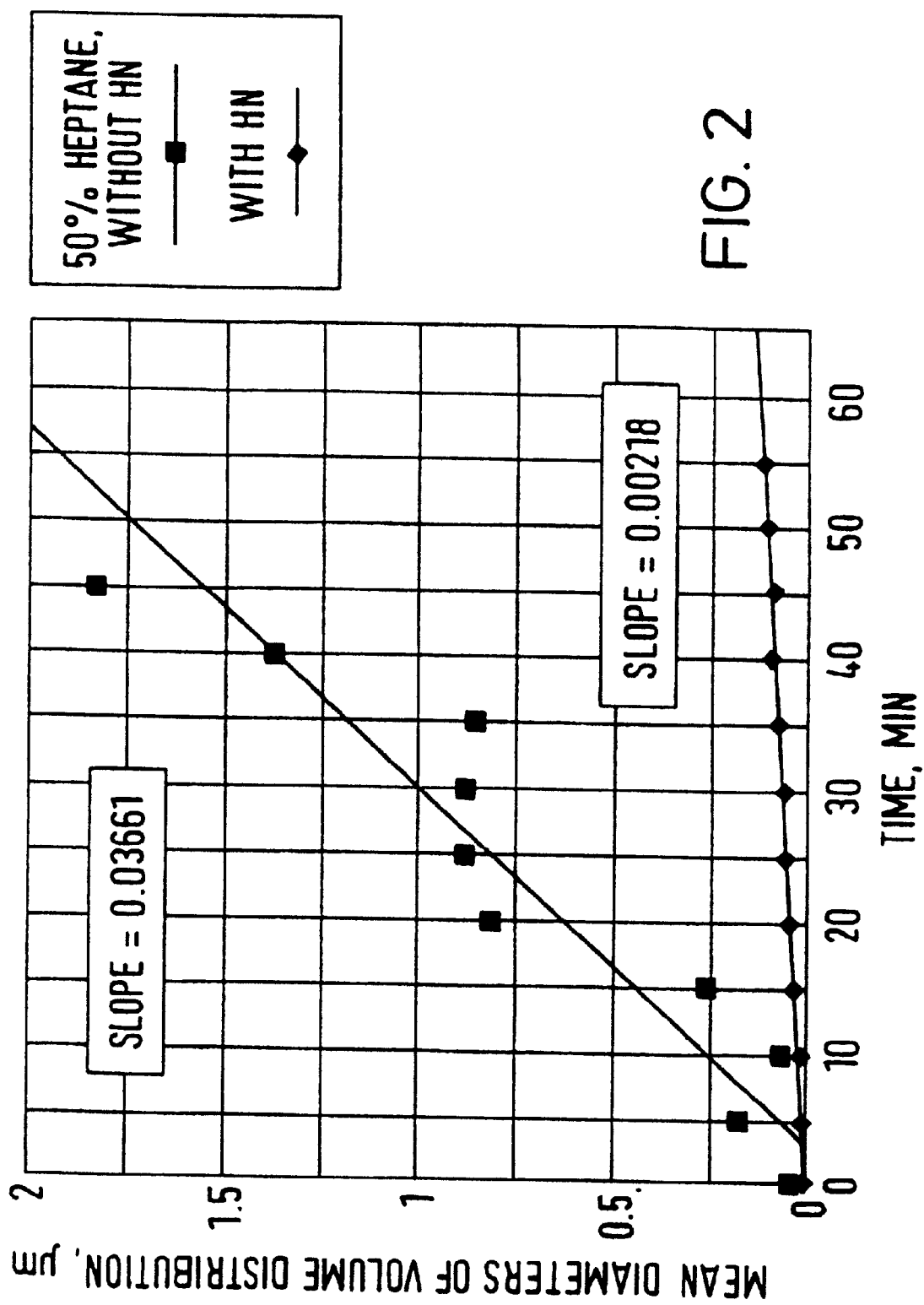
FIG. 2 is a graph showing the asphaltene aggregation rate with time under the influence of 50% n-heptane.

FIG. 2 shows a plot of average particle volume (expressed as a diameter) against time on the addition of 50% by volume of n-heptane to asphaltene solutions in toluene. The increase in size of asphaltene particles in the absence of 2-hexadecyl naphthalene was found to be 0.037 $\mu$m/minute, whereas in the presence of 2-hexadecyl naphthalene the aggregation rate dropped to 0.0022 $\mu$m/minute. This shows that 2-hexadecyl naphthalene slows the aggregation rate by 17 times even though the 2-hexadecyl naphthalene was not designed to be especially effective in toluene. The linearity of the volume plot (even though expressed as the equivalent diameter) indicates that the major process occurring has been aggregation (coagulation) rather than growth by deposition of molecules on to existing particles.

Figure 3:
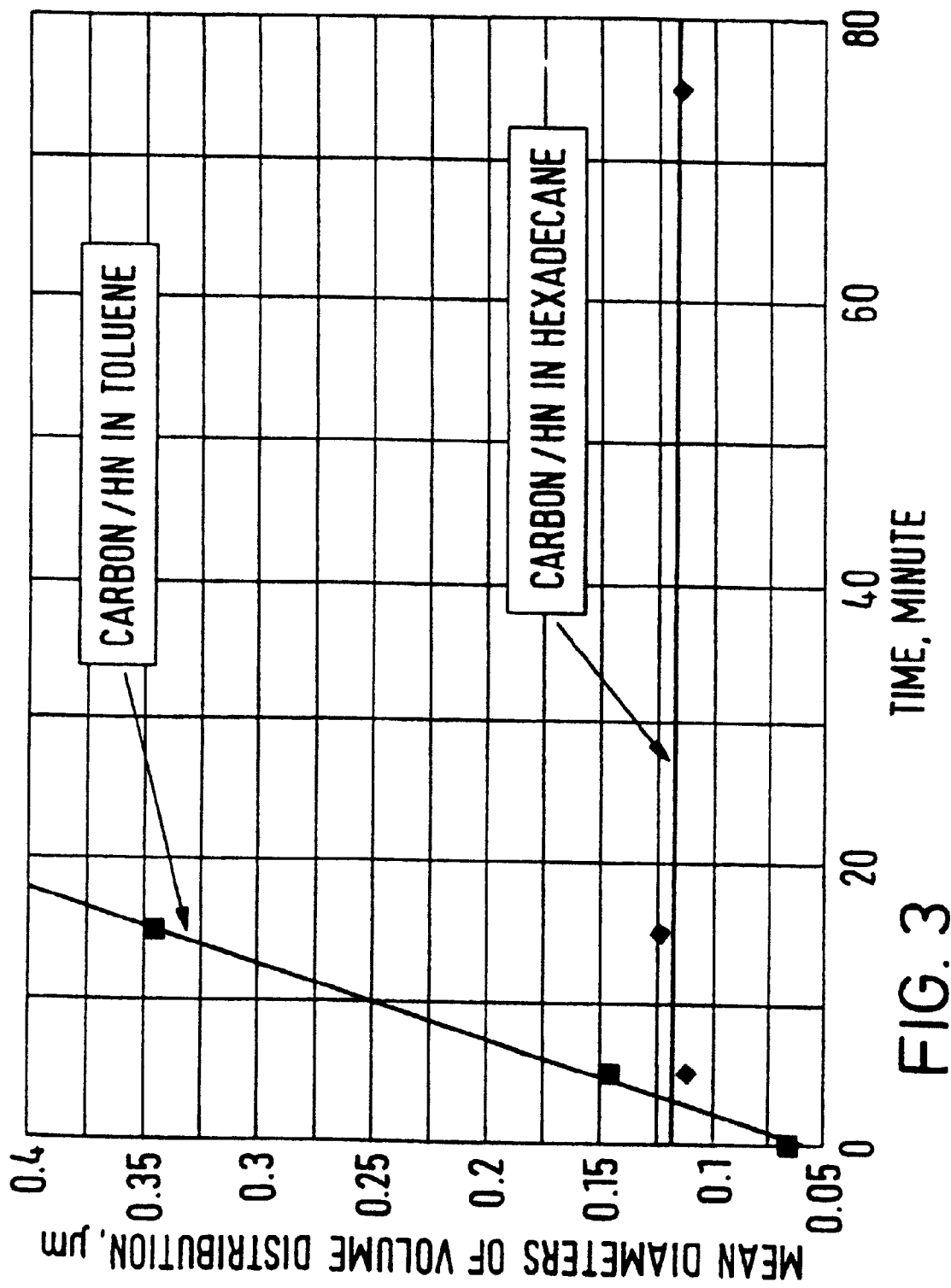
FIG. 3 is a graph showing the results of trials of stabilisation of carbon dispersion by 2-hexadecyl naphthalene in toluene and hexadecane.

FIG. 3 shows the effect of 2-hexadecyl naphthalene on the stabilisation of carbon particles dispersed separately in hexadecane and toluene. It clearly shows that 2-hexadecyl naphthalene is considerably more effective at stabilising carbon particles in the aliphatic hexadecane than in toluene. This is no doubt due to the greater extension of the hexadecyl chain in hexadecane than in toluene, hexadecane being a good solvent for 2-hexadecyl naphthalene.

What is claimed is:

1. A method of controlling asphaltene precipitaion in a fluid comprising the addition of a precipitation inhibitor to the fluid containing the asphaltene, wherein said precipitation inhibitor comprises a first part which is capable of adsorbing onto an asphaltene particle and a second part which is capable of dissolving in the fluid and is a hydrocarbon-based chain or polymer.

2. A method according to claim 1, in which the dissolving part of the precipitation inhibitor is a hydrocarbon-based aliphatic chain or polymer.

3. A method according to claim 1, in which the fluid is an aliphatic fluid.

4. A method according to claim 3, in which the aliphatic liquid is crude oil.

5. A method according to claim 4, in which the aliphatic liquid is crude oil.

6. A method of controlling asphaltene precipitaion in a fluid comprising the addition to the fluid containing the asphaltene of a compound of general formula I:

$$X—(R)_n \qquad \qquad I$$

where X is a carbocyclic ring;
R is an aliphatic chain; and
n is at least 1 and is not greater than the valency of X.

7. A method according to claim 6, in which X is an optionally substituted mono- or bi-cyclic ring having in the range of 6 to 16 carbon atoms.

8. A method according to claim 7, in which X is benzene, naphthalene or anthracene.

9. A method according to any one of claim 6, in which R is an optionally substituted alkyl group having in the range of 10 to 25 carbon atoms.

10. A method according to claim 9, in which R has in the range of 12 to 20 carbon atoms.

11. A method according to claim 10, in which R is hexadecyl.

12. A method according to any one of claim 6, in which n is 1, 2 or 3.

13. A method according to claim 6, in which the fluid is an aliphatic fluid.

14. A method according to claim 13, in which the aliphatic liquid is crude oil.

15. A method of controlling asphaltene precipitation in a fluid comprising the addition of hexadecyl naphthalene to the fluid comprising the asphaltene.

16. A method according to claim 15, in which the hexadecyl naphthalene is 1-hexadecyl or 2-hexadecyl naphthalene.

17. A method according to claim 15, in which the fluid is an aliphatic fluid.

* * * * *